(12) United States Patent
Gao

(10) Patent No.: US 11,416,439 B2
(45) Date of Patent: Aug. 16, 2022

(54) USB-C CONNECTION LINE AND USB-C CONNECTION LINE SIGNAL JUDGEMENT METHOD THEREOF

(71) Applicant: LeRain Technology Co., Ltd., New Taipei (TW)

(72) Inventor: Miaobin Gao, New Taipei (TW)

(73) Assignee: LERAIN TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 17/200,328

(22) Filed: Mar. 12, 2021

(65) Prior Publication Data

US 2022/0100695 A1    Mar. 31, 2022

(30) Foreign Application Priority Data

Sep. 30, 2020   (TW) ................................ 109134245

(51) Int. Cl.
    *G06F 13/42*   (2006.01)
(52) U.S. Cl.
    CPC ...... *G06F 13/4295* (2013.01); *G06F 13/4286* (2013.01); *G06F 13/4291* (2013.01); *G06F 2213/0042* (2013.01); *G06F 2213/2406* (2013.01)

(58) Field of Classification Search
    CPC ............. G06F 13/4295; G06F 13/4286; G06F 13/4291; G06F 2213/0042; G06F 2213/2406
    See application file for complete search history.

(56) References Cited

U.S. PATENT DOCUMENTS

| | | | |
|---|---|---|---|
| 2018/0143674 A1* | 5/2018 | Card | G06F 13/4282 |
| 2018/0287375 A1* | 10/2018 | Su | H02H 1/0084 |
| 2019/0332150 A1* | 10/2019 | Bodnaruk | G06F 1/263 |
| 2019/0332566 A1* | 10/2019 | Yasu | H04L 25/0282 |

* cited by examiner

*Primary Examiner* — Glenn A. Auve
(74) *Attorney, Agent, or Firm* — Muncy, Geissler, Olds & Lowe, P.C.

(57) ABSTRACT

A USB-C connection line and a USB-C connection line signal judgement method thereof are disclosed. The USB-C connection line can be connected between a first electronic device and a second electronic device. The USB-C connection line includes a receiver detector, a first signal detector, a second signal detector, and a controller. The receiver detector is used to detect whether a receiver signal is received; the receiver signal means that the first electronic device or the second electronic device is connected to a first port or a second port. The first signal detector and the second signal detector are used to detect whether an input signal is transmitted from the first electronic device or the second electronic device. The controller is used to determine whether any one of the input signal or the receiver signal is received so as to execute a startup procedure.

9 Claims, 3 Drawing Sheets

USB-C CONNECTION LINE AND USB-C CONNECTION LINE SIGNAL JUDGEMENT METHOD THEREOF

BACKGROUND OF THE INVENTION

1. Field of the Invention

The present invention relates to a USB-C connection line and a USB-C connection line signal judgement method thereof, and particularly to a USB-C connection line and a USB-C connection line signal judgement method thereof that can speed up a startup procedure.

2. Description of the Related Art

With the advancement of technology, USB-C connection line has become common. The USB-C connection line is a universal serial bus (USB) hardware interface. The biggest feature in appearance is that the upper and lower sides of the ports at both ends are exactly the same, so there is no need to distinguish between the top and bottom of the port. In the prior art, the USB-C connection line needs to execute a receiver detect (RX Detect) function to determine whether an electronic device is connecting or an electronic device which is connected is in a sleep state so as to determine whether each module of the USB-C connection line needs to be polled, and further allow the USB-C connection line to enter a normal execution state. However, in the prior art, the RX Detect needs to transfer data with an external microcontroller chip, which will cause the startup speed of the USB-C connection line to be slow. Besides, a micro-controller always has to be in a monitoring mode, which consumes power.

Accordingly, it is necessary to provide a new USB-C connection line and a USB-C connection line signal judgement method thereof to solve the problem in the prior art.

SUMMARY OF THE INVENTION

It is a major objective of the present invention to provide a USB-C connection line that can speed up a startup procedure.

It is another objective of the present invention to provide a USB-C connection line signal judgement method used for the above USB-C connection line.

To achieve the above objectives, an USB-C connection line of the present invention is used for connecting between a first electronic device and a second electronic device. The USB-C connection line comprises a first port, a second port, a receiver detector, a first signal detector, a second signal detector, and a controller. The first port or the second port is able to connect to the first electronic device or the second electronic device individually. The receiver detector is electrically connected to the first port or the second port for detecting whether a receiver signal is received, wherein the receiver signal means that the first electronic device or the second electronic device is connected to the first port or the second port. The first signal detector is electrically connected to the first port, and the second signal detector is electrically connected to the second port, wherein the first signal detector and second signal detector detect whether an input signal is transmitted from the first electronic device or the second electronic device. The controller is electrically connected to the first signal detector, the second signal detector, and the receiver detector for determining whether any one of the input signals or the receiver signal is received so as to execute a startup procedure.

A USB-C connection line signal judgement method of the present invention is used for a USB-C connection line, wherein the USB-C connection line is connected between a first electronic device and a second electronic device and comprises a first port, a second port, a receiver detector, a first signal detector, a second signal detector, and a controller. The method comprises the following steps: detecting, by the first signal detector and the second signal detector, whether an input signal is transmitted from the first electronic device or the second electronic device; detecting, by the receiver detector, whether a receiver signal is received, wherein the receiver signal means that the first electronic device or the second electronic device is connected to the first port or the second port; determining, by the controller, whether any one of the input signal or the receiver signal is received; and if yes, executing a startup procedure.

DETAILED DESCRIPTION OF THE PREFERRED EMBODIMENT

Hereafter, the technical content of the present invention will be better understood with reference to preferred embodiments.

Figure 1:
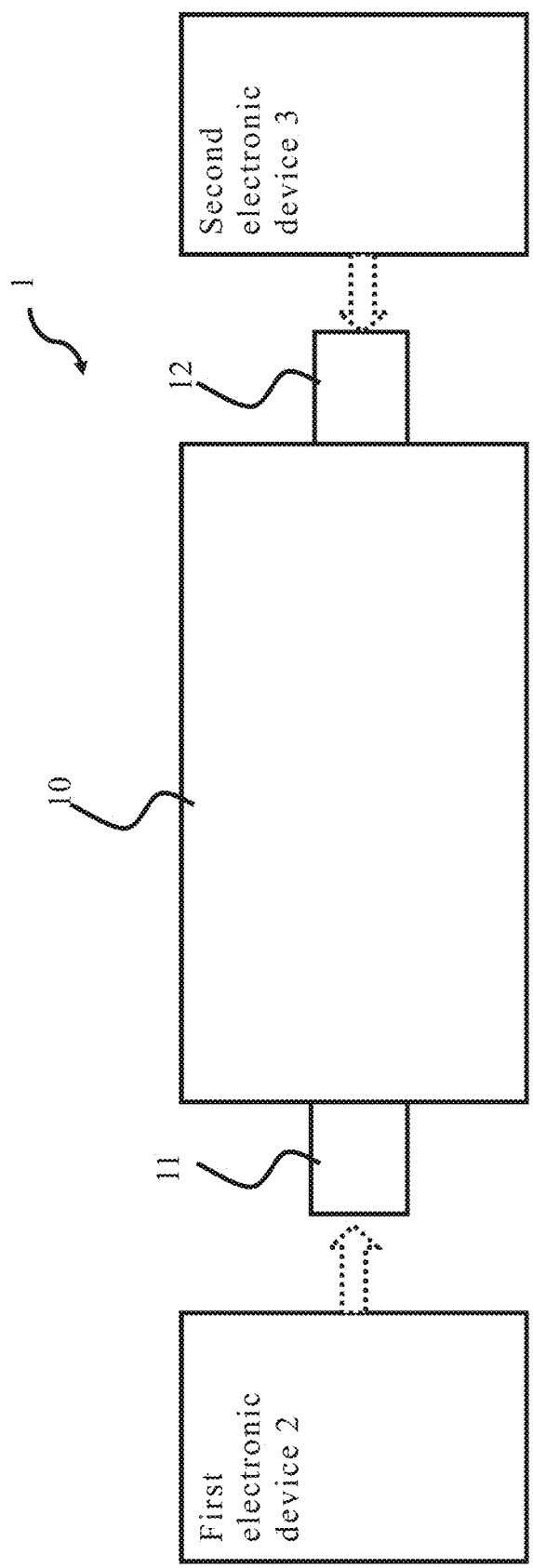
FIG. 1 is a schematic diagram showing a USB-C connection line connecting between a first electronic device and a second electronic device of the present invention.

Please first refer to FIG. 1 for a schematic diagram showing a USB-C connection line connecting between a first electronic device and a second electronic device of the present invention.

In an embodiment of the present invention, a USB-C connection line 1 is a universal serial bus (USB) hardware interface and is used for connecting between a first electronic device 2 and a second electronic device 3 via a first port 11 and a second port 12. The first electronic device 2 and second electronic device 3 both can be a desktop computer system, a laptop, a smart phone, a tablet or a wearable device. The first electronic device 2 can be set as a main control host, and the second electronic device 3 can be set as a device to be connected, but the present invention is not limited thereto. According to the specifications of USB-C, the shapes of the upper and lower sides of the first port 11 and the second port 12 are the same. The first port 11 and the second port 12 both have 24 pins, and each of the upper and lower sides has 12 pins used for connecting to multiple channels 10 inside the USB-C connection line 1. Thus, the first port 11 and the second port 12 can be connected to the first electronic device 2 and the second electronic device 3 with the upper or lower sides, and then the first electronic device 2 and the second electronic device 3 can use a plurality of channels 10 to transmit signals in the forward or reverse directions. Since the connection method of the USB-C connection line 1 is already known to those in the technical field of the present invention, it will not be further described here.

Figure 2:
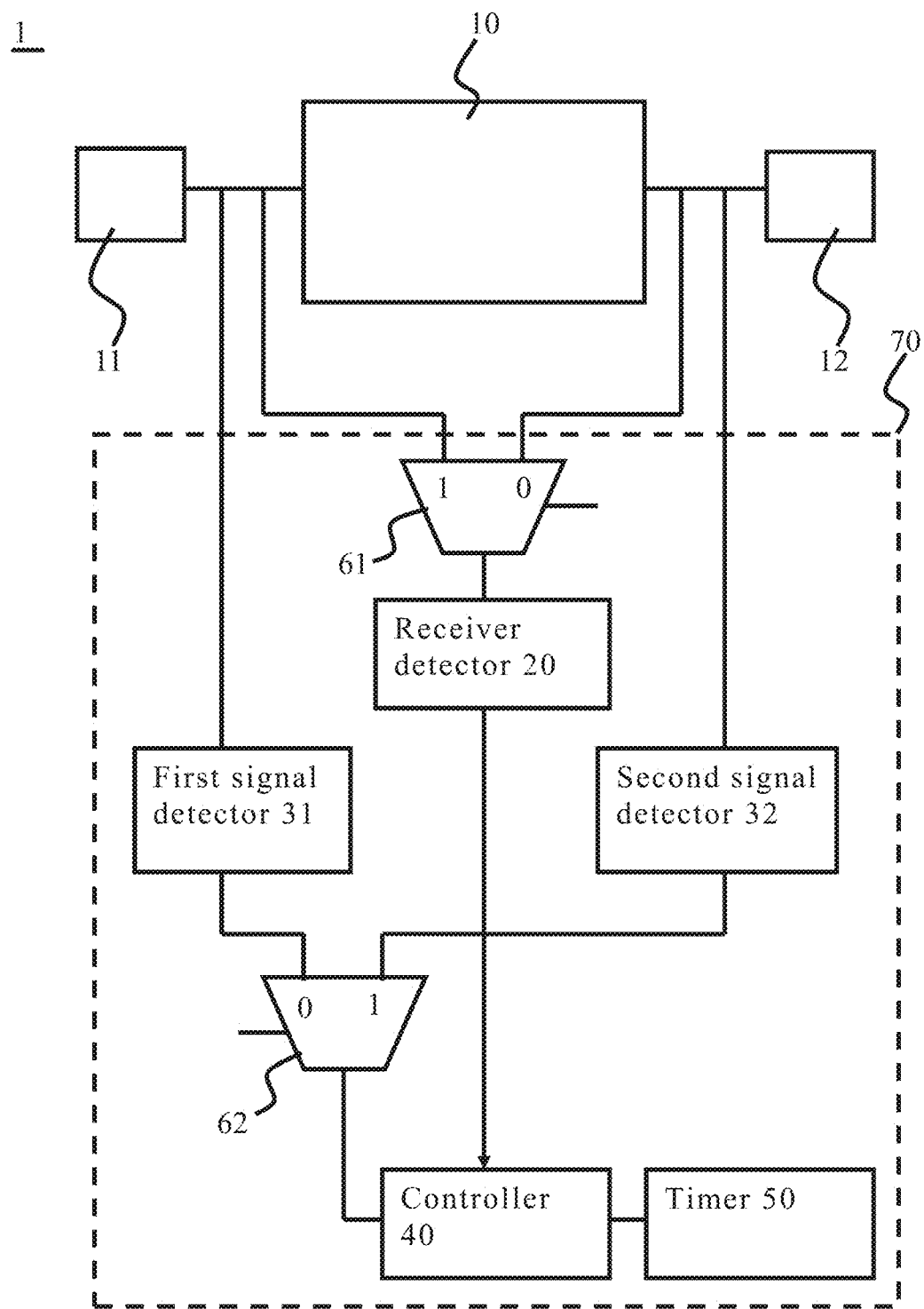
FIG. 2 is a structure schematic diagram showing the USB-C connection line of the present invention.

Please first refer to FIG. 2 for a structure schematic diagram showing the USB-C connection line of the present invention.

In addition to the first port 11 and the second port 12 mentioned above, the USB-C connection line 1 further comprises a receiver detector 20, a first signal detector 31, a second signal detector 32, and a controller 40. The receiver detector is electrically connected to the first port 11 or the second port 12 for determining whether a receiver signal is detected or not. The receiver signal is defined as the signal detected when the first electronic device 2 or the second electronic device 3 is connected to the first port 11 or the second port 12. The receiver signal may also be defined as the signal detected when the first electronic device 2 or the second electronic device 3 returns to a normal state from a sleep state. The receiver detector can use a method of detecting a voltage change of the channel 10 disposed within the USB-C connection line 1 to determine whether the receiver signal is detected, but the present invention is not limited to the abovementioned description.

In one embodiment of the present invention, any signal transmitted from the first port 11 to the second port 12 is defined as a forward signal, and any signal transmitted from the second port 12 to the first port 11 is defined as a reverse signal. However, the above forward signal and reverse signal are only examples, and the present invention is not limited to the abovementioned definition. In order to enable the receiver detector 20 to detect the receiver signal of the USB-C connection line 1 in both directions, the USB-C connection line 1 can further comprise a first multiplexer 61. The first multiplexer 61 is electrically connected to the first port 11 and the second port 12 and then connected to the receiver detector 20. The first port 11 and the second port 12 can be connected to the two input terminals of the first multiplexer 61, the receiver detector 20 is connected to the output terminal of the first multiplexer 61, and the select terminal of the first multiplexer 61 selects the forward or the reverse receiver signal. Thus, the receiver detector 20 can detect correctly whether it is a forward or reverse receiver signal.

The first signal detector 31 of the USB-C connection line 1 is electrically connected to the first port 11. The second signal detector 32 is electrically connected to the second port 12. Thus, the first signal detector 31 can detect the forward input signal transmitted into the first port 11, and the second signal detector 32 can detect the reverse input signal transmitted into the second port 12. As a result, the first signal detector 31 and the second signal detector 32 can detect whether the input signal is transmitted from the first electronic device 2 or the second electronic device. The type of the input signal can be a high-speed signal or a low frequency periodic signal (LFPS), etc., but the present invention is not limited to the type of the signal. The controller 40 electrically connected to the first signal detector 31, the second signal detector 32, and the receiver detector 20 are used for determining whether to receive either the input signal or the receiver signal so as to execute a startup procedure. The startup procedure is a series of procedures such as polling, recovery, and hot reset, so the USB-C connection line 1 is able to enter a normal working state.

In one embodiment of the present invention, the USB-C connection line 1 further comprises a second multiplexer 62 which is electrically connected between the first signal detector 31, the second signal detector 32, and the controller 40. The first signal detector 31 and the second signal detector 32 can be connected to the two input terminals of the second multiplexer 62, the controller 40 is connected to the output terminal of the second multiplexer 62, and the select terminal of the second multiplexer 62 is inputted the reverse signal. Thus, the controller 40 can determine correctly whether the forward or reverse input signal is received.

The USB-C connection line 1 further comprises a timer 50 which is electrically connected to the controller 40 for providing a timer function. Thus, the controller 40 controls the receiver detector 20 to execute detection at each set time. The set time can be adjusted according to the status of the USB-C connection line 1, and the present invention does not limit the number of set times. Therefore, first, when the USB-C connection line 1 is not activated, such as when the USB-C connection line 1 is in the state of U1, U2 or U3, the controller 40 enables the first signal detector 31 or the second signal detector 32 to start to detect whether there is an input signal transmitted from the first electronic device 2 or the second electronic device 3. Then, when the receiver detector 20 is not activated, the controller 40 allows the timer 50 to start timing. When the timer 50 counts to the set time, the controller 40 activates the receiver detector 20 to detect whether the receiver signal is received. If either the first signal detector 31 or the second signal detector 32 detects the input signal during the receiver detection process, the controller 40 cancels the action of the receiver detector 20, resets the timer 50, and executes the startup procedure of the USB-C connection line 1; that is, the USB-C connection line 1 enters a U0 state. If the receiver detector 20 received the receiver signal, the controller 40 resets the timer 50 and executes the startup procedure of the USB-C connection line 1.

It is to be noted that the various modules existing in the USB-C connection line 1 can be constructed of hardware devices. In addition, the first signal detector 31, the second signal detector 32, the controller 40, the timer 50, the first multiplexer 61, the receiver detector 20, and second multiplexer 62 can be configured in the chip 70. Also, it is to be noted that the present embodiment is just an example of preferred embodiments of the present invention, and to avoid superfluous descriptions, not all possible variations or combinations are described herein. However, it can be readily understood by those skilled in the art that each of the above modules or components may not be necessary. For implementation of the present invention, other specific prior-art modules or components may be included. All modules or components can be omitted or modified as needed, and there may be other modules or components between any two modules.

Figure 3:
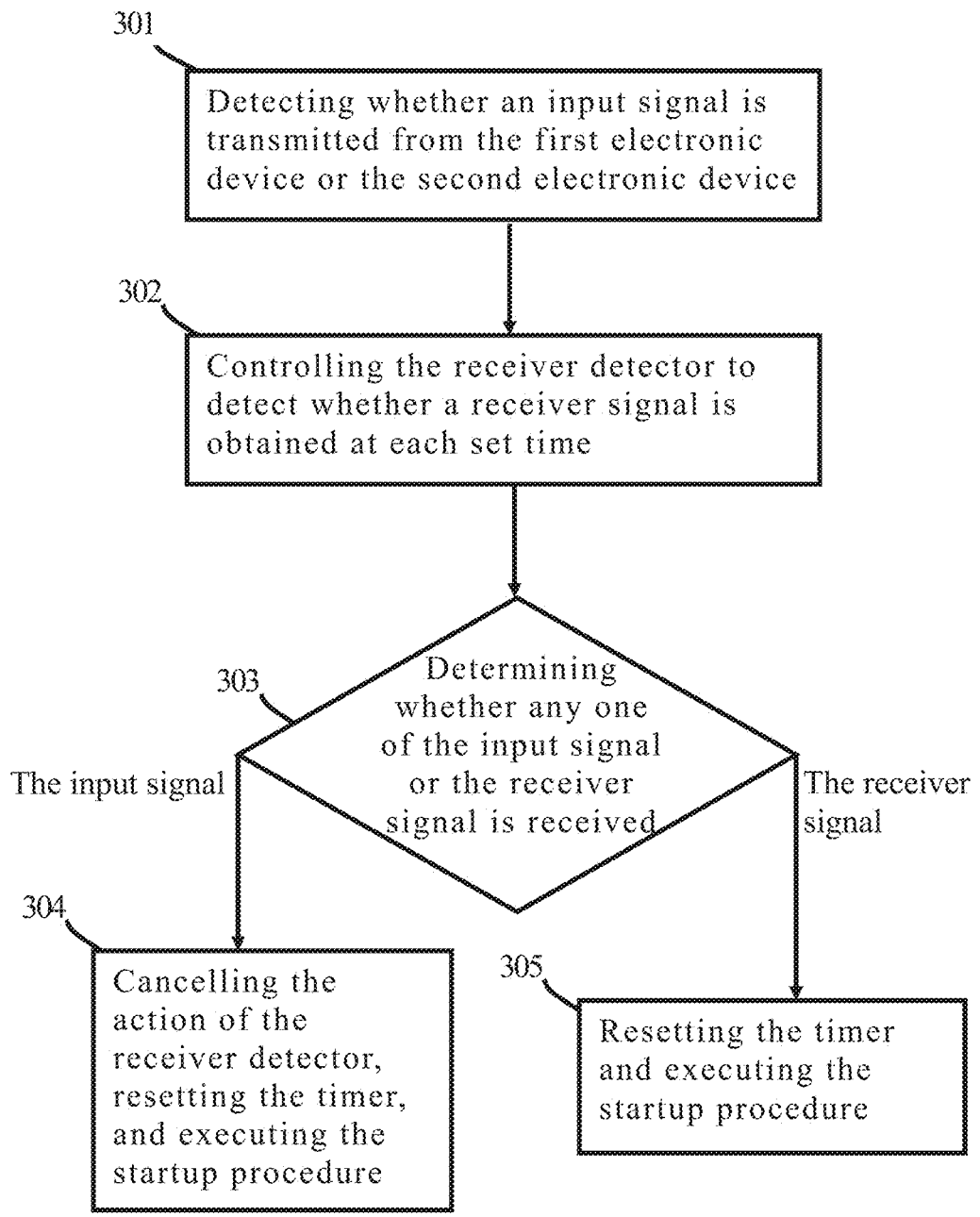
FIG. 3 is a flowchart showing steps of a USB-C connection line signal judgement method of the present invention.

Next, please refer to FIG. 3 for a flowchart showing steps of a USB-C connection line signal judgement method of the present invention. It should be noted here that, although the USB-C connection line 1 described above is employed as an example to illustrate the USB-C connection line signal judgement method of the present invention, the USB-C connection line signal judgement method of the present invention is not limited to a USB-C connection line 1 using the same structure as described above.

Step 301 is first performed: detecting whether an input signal is transmitted from the first electronic device or the second electronic device.

First, when the USB-C connection line 1 is not activated, the controller 40 enables the first signal detector 31 or the second signal detector 32 to detect whether an input signal is transmitted from the first electronic device 2 or the second electronic device 3.

At the same time, step 302 is performed: controlling the receiver detector to detect whether a receiver signal is obtained at each set time.

At the same time, the controller 40 causes the timer 50 to start timing. When the timer 50 counts to the set time, the controller 40 activates the receiver detector 20 to detect whether a receiver signal is received.

Then step 303 is performed: determining whether any one of the input signal or the receiver signal is received.

Thus, the controller 40 can determine whether any one of the first signal detector 31 or the second signal detector 32 has detected the input signal, or whether the receiver detector 20 has received the receiver signal.

If the input signal is received, step 304 is performed: cancelling the action of the receiver detector, resetting the timer, and executing the startup procedure.

At this time, the controller 40 cancels the action of the receiver detector to allow the receiver detector 20 to return to a suspended state. Then the timer 50 is reset to restart timing. Finally, the controller 40 executes the startup procedure to make the USB-C connection line 1 enter a working state.

Finally, if the receiver signal is received, step 305 is performed: resetting the timer and executing the startup procedure.

At this time, the controller 40 resets the timer 50 and executes the startup procedure of the USB-C connection line 1.

It is to be noted that the USB-C connection line signal judgement method disclosed in the present invention is not limited to the above-mentioned sequence of steps. As long as the object of the present invention can be accomplished, the above sequence of steps can be modified.

As a result, the USB-C connection line 1 of the present invention can use input signal detection to achieve the purpose of quick startup, and the USB-C connection line 1 can still has the function of two-way signal detection and the function of detecting whether the first electronic device 2 or the second electronic device 3 is connected, so as to save energy and simplify the control circuit.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A USB-C connection line, for connecting between a first electronic device and a second electronic device, the USB-C connection line comprising:
    a first port;
    a second port, wherein the first port or the second port is able to connect to the first electronic device or the second electronic device individually;
    a receiver detector electrically connected to the first port or the second port for detecting whether a receiver signal is received; wherein the receiver signal means the first electronic device or the second electronic device is connected to the first port or the second port;
    a first signal detector, electrically connected to the first port;
    a second signal detector, electrically connected to the second port; wherein the first signal detector and second signal detector are used for detecting whether an input signal is transmitted from the first electronic device or the second electronic device;
    a controller, electrically connected to the first signal detector, the second signal detector, and the receiver detector for determining whether any one of the input signal or the receiver signal is received, so as to execute a startup procedure; and
    a timer, electrically connected to the controller for providing a timing function; wherein when the receiver detector is not activated, the controller controls the timer to start timing; when every time the timer counts to a set time, the controller controls the receiver detector to detect whether the receiver signal is received.

2. The USB-C connection line as claimed in claim 1, wherein when the input signal is received, the controller cancels an action of the receiver detector, resets the timer, and executes the startup procedure.

3. The USB-C connection line as claimed in claim 2, wherein when the receiver signal is received, the controller resets the timer and executes the startup procedure.

4. The USB-C connection line as claimed in claim 1, further comprising a first multiplexer electrically connected to the first port and the second port and further connected to the receiver detector.

5. The USB-C connection line as claimed in claim 4, further comprising a second multiplexer electrically connected to the first signal detector and the second signal detector.

6. The USB-C connection line as claimed in claim 5, wherein the first signal detector, the second signal detector, a timer, the first multiplexer, the receiver detector, the second multiplexer, and the controller are disposed in a chip.

7. A USB-C connection line signal judgement method, used for a USB-C connection line, wherein the USB-C connection line is connected between a first electronic device and a second electronic device, and comprises a first port, a second port, a receiver detector, a first signal detector, a second signal detector, a timer, and a controller; the method comprising the following steps:
    detecting, by the first signal detector and the second signal detector, whether an input signal is transmitted from the first electronic device or the second electronic device;
    controlling, by the controller, the timer to start timing when the receiver detector is not activated;
    controlling, by the controller, the receiver detector to detect whether a receiver signal is received when every time the timer counts to a set time, wherein the receiver signal means that the first electronic device or the second electronic device is connected to the first port or the second port;
    determining, by the controller, whether any one of the input signal or the receiver signal is received; and
    if any one of the input signal or the receiver signal is received, executing a startup procedure.

8. The USB-C connection line signal judgement method as claimed in claim 7, further comprising the following step:
    cancelling an action of the receiver detector, resetting the timer and executing the startup procedure when the input signal is received.

9. The USB-C connection line signal judgement method as claimed in claim 8, further comprising the following step:
    resetting the timer and executing the startup procedure when the receiver signal is received.

* * * * *